United States Patent Office 3,825,664
Patented July 23, 1974

3,825,664
METHOD FOR TREATING BACTERIAL TOXINS
Guy Hagemann, Nogent sur Marne, and Francois Clemence, Rosny-sous-Bois, France, assignors to Roussel-UCLAF, Paris, France
No Drawing. Filed Jan. 6, 1971, Ser. No. 104,516
Claims priority, application France, Jan. 13, 1970, 7001040
Int. Cl. A61k 27/00
U.S. Cl. 424—316                   5 Claims

ABSTRACT OF THE DISCLOSURE

Compositions for treating microbic infections having as the active ingredient racemic or optically active isomers of N-succinyl-glutamic acid and its non-toxic, pharmaceutically acceptable salts with mineral or organic bases and a method of combatting infections in warm-blooded animals.

OBJECTS OF THE INVENTION

It is an object of the invention to provide novel compositions for the treatment of toxic effects of diverse bacterial toxins.

It is a further object of the invention to provide compositions for lessening the toxic effect of strong doses of certain antibiotics.

It is another object of the invention to provide a novel method of combatting bacterial infections in warm-blooded animals.

These and other objects and advantages of the invention will become obvious from the following detailed description.

THE INVENTION

The novel compositions of the invention for providing protection against the toxic effect of diverse bacterial toxins are comprised of an effective amount of an active compound selected from the group consisting of racemic mixtures and optically active isomers of N-succinyl-glutamic acid and its salts with non-toxic, pharmaceutically acceptable mineral and organic bases and optionally an antibiotic and a pharmaceutical carrier. The usual daily dose is 0.5 to 4 g. of the active compound with an individual dose of 0.1 to 2 gm. for the adult depending upon the method of administration.

The detoxicant effects of the compositions are profitable in association with certain antibiotics as it reduces fatigue effects on the organism attributable to prolonged administration of the antibiotic and the liberation of toxins resulting from its action on bacteria responsible for the infection.

The compositions are therapeutically useful particularly for the treatment of microbial infections which are grave or persistant to antibiotics alone. They are notably convenient for treatment of broncho-pneumonia, of pyelonephritis, of intestinal infections due to enterococcus, of meningococcus, of pneumonae from pneumococcus, of bacterial dysentary and of brucellosis.

The term antibiotic is intended to mean compounds having conspicuous antibacterial properties such as the chemical family of tetracyclines, penicillins, erythromycin, chloroamphenicol, of streptomycin, gentamycin and cephalosporins. Among the preferred compounds of the tetracycline family are oxytetracycline, chlorotetracyclin, 6-demethyl-7-chlorotetracyclin and N-pyrrolidinomethyl-tetracycline and the salts of tetracycline such as its hydrochloride, theophylline ethane sulfonate, hexametaphosphate, lauryl sulfate and fusidate. Among the preferred members of the penicillin family are penicillin G (sodium salt), penicillin K, potassium phenoxymethyl penicillinate and sodium 1-(2'-benzyl-1',2',3',4'-tetrahydroisoquinoleinyl) carbonylamino-penicillinate.

The compositions have a great therapeutic interest for their detoxifying action against secondary effects resulting from prolonged use of certain antibiotics. In fact the prolonged treatment with the usual antibiotics such as pencillins or compounds of the tetracycline family made necessary by general bacterial infections, often causes an important fatigue in the organism which can be attributed to the toxic effects of the antibiotic administered for several days at elevated or repeated doses and especially to the effects of the bacterial toxins freed by the more or less rapid action of the antibiotic against the germs responsible for the infection.

It is desirable to realize a chemiotherapy effective at the same time by its antimicrobial and antitoxin activity due to the association of the antibiotic and a substance considered to be a "detoxicant" capable of rapidly neutralizing the noxious influence of bacterial endotoxins or the secondary effects from the toxicity owned by the antibiotic without reducing the efficacy. For this purpose, the detoxicating action of glucuronates of amino acids of the Krebs cycle against certain products such as isoniazide has already been pointed out.

Although N-succinyl-glutamic acid or its salts with a non-toxic, pharmaceutically acceptable organic or mineral base are entirely deprived of bacteriostatic or bactericidal properties, they possess a net detoxicating effect against microbial toxins and in association with an antibotic prevents the appearance of all toxic phenomena while maintaining the antibiotic activity at least equal during the time of massive or prolonged treatments with such products.

N-succinyl-L-glutamic acid, N-succinyl-D-glutamic acid or N-succinyl-DL-glutamic acid can be used without any difference in activity. The salts of the acids can be a salt of one or more of the carboxylic functions.

Examples of suitable non-toxic, pharmaceutically acceptable salts are alkali metal salts such as sodium or potassium, ammonium salt; alkaline earth metal salts such as calcium or strontium; magnesium; aluminum; or salts of organic bases such as alkylamines such as ethylamine, diisopropylamine, ethanolamine, diethylamino ethanol; arylamines such as N,N - dimethyl - phenylethylamine, gramine; or amino acid salts such as those of leucine, serine, valine, histidine, arginine, phenylalanine or lysine.

The novel preferred compositions of the invention contain an antibiotic of one of the above mentioned families and N-succinyl-glutamic acid or its non-toxic, pharmaceutically acceptable salts in proportions which can be varied over a very wide range and can vary from 10 parts antibiotic per one part of N-succinyl-glutamic acid to 1 part of antibiotic to 10 parts of N-succinyl-glutamic acid. The compositions preferably contain equal parts of said antibiotic and acid. Nevertheless, it is possible to obtain the same order of efficacy with compositions containing a lower proportion of N-succinyl-glutamic acid with, for example, a mixture containing 2 parts of antibiotic and one part of N-succinyl-glutamic acid and conversely, it is possible to prepare without inconvenience compositions containing high amounts of N-succinyl-glutamic acids. The said compositions have an activity near to or equal to that of the optimum mixtures.

The novel compositions of the invention may be in the form of injectable solutions or suspensions, tablets, coated tablets, gelatin capsules, granules, aromatic powders, syrups, drinkable suspensions or solutions or suppositories.

The dosage depends upon the presence or absence of an antibiotic in the composition, the amount of antibiotic therein, the method of administration and the microbial infection being treated. With an antibiotic, the dosage is of the same order as compositions containing only the antibiotic.

The preferred compositions have equal doses of the antibiotic and N-succinyl-glutamic acid or its said salts but it can likewise vary from one tenth to ten times the amount of antibiotic. The daily dosage may range from 0.5 to 4 g. of active product in the adult with an individual dose of 0.1 to 2 g. of active product.

In addition to the said active principle, the compositions can contain other active principles such as eupneic agents and particularly theophylline and its derivatives, disinfectants or bactericides, absorbent agents such as commercial polycaprolactam sold under the name Divergan SZ 9010, commercial polyvinylpyrrolidone sold under the name Polyclar AT or commercial casein formulae sold under the name Capillact, analgesic agents such as lignocaine or antalgics such as glafenine, antispasmodics such as oxytefonium bromide or antiinflammatory agents whose activity can reinforce or add to the above mentioned activity.

The salts of N-succinyl-glutamic acid can be obtained by usual salification processes or by double decomposition. The proportions of base or basic agent used can salify one or more carboxylic acid functions. To form the salt of a mineral base, the neutralization of N-succinyl-glutamic acid is preferably effected with a hydroxide, carbonate or bicarbonate in an aqueous media. For the salts of organic bases, it is preferred to operate in an organic solvent in the presence or absence of water. The salts of amino acids may be easily formed in aqueous media.

N-succinyl-glutamic acid can be prepared by reacting a lower alkyl ester of glutamic acid with succinic acid anhydride to obtain the lower alkyl ester of N-succinyl-glutamic acid which is esterified with an alkanol in the presence of an acid catalyst to obtain the lower alkyl ester of alkoxy carbonyl propionyl-glutamic acid which is saponified in an alkaline media.

The novel method of the invention for treating bacterial infections in warm-blooded animals comprises administering to warm-blooded animals a safe and effective amount of N-succinyl-glutamic acid or its non-toxic, pharmaceutically acceptable salts. The said compounds can be administered parenterally, orally or rectally. The usual daily dose is 8 to 70 mg./kg.

In the following examples there are described several preferred embodiments to illustrate the invention. However, it should be understood that the invention is not intended to be limited to the specific embodiments.

EXAMPLE I

Preparation of N-succinyl-L-glutamic acid

Step A: A solution of 25.4 g. of ethyl L-glutamate in 100 cc. of benzene was added to a suspension of 13.10 g. of succinic acid anhydride in 100 cc. of benzene and the mixture was stirred for 4 hours at room temperature. The solvent was evaporated off under reduced pressure and the residue consisting of ethyl N-(hydroxycarbonylpropionyl)-L-glutamate was taken up in ethanol. The mixture was heated at reflux for 4 hours in the presence of a few drops of sulfuric acid and the alcohol was evaporated off. The residue was crystallized from isopropanol to obtain an 87% yield of ethyl N - ($\beta$ - carbethoxypropionyl)-L-glutamate in the form of colorless crystals melting at 45° C.

Analysis: $C_{15}H_{25}NO_7$; molecular weight=331.36
Calculated: Percent N 4.22
Found: 4.17
IR Spectrum: Bands at 3310, 1740, 1175 and 1025 cm.$^{-1}$ Step B: 15 gm. of ethyl N-($\beta$-carbethoxypropionyl)-L-glutamate in N sodium hydroxide were heated at 30° C. for 2 hours and the resulting solution was passed through a commercial cationic sulfonic acid exchange resin sold under the trademark Dowex and the water was evaporated from the solution under reduced pressure. The residue was crystallized from a benzene-ether mixture to obtain a 90% yield of N-succinyl-L-glutamic acid melting at 76° C. and having a specific rotation $[\alpha]_D^{25} = -14°$ (C=4% in water).

The product occurred in the form of colorless crystals soluble in water and alcohol and insoluble in ether.

Analysis: $C_9H_{13}NO_7$; molecular weight=265.20
Calculated: %C, 40.76; %H, 5.70; %N, 5.27
Found: %C, 40.4; %H, 5.8; %N, 5.4
IR Spectrum (potassium bromide): Bands at 2020, 1700, 1540, 1000 and 800 cm.$^{-1}$ The product is identical to that described by Aubert et al. [C.R.Ac. Sci., Vol. 249 (1959), p. 1956–58].

EXAMPLE II

Preparation of Sodium N-succinyl-L-glutamate 1.32 g. of N-succinyl-L-glutamic acid were dissolved in 30 cc. of water and 5 cc. of a 3N sodium hydroxide solution were progressively added with cooling. The reaction mixture was then evaporated to dryness under reduced pressure and the residue was taken up in a minimum of hot 90% ethanol. The solution was cooled to form a crystalline precipitate which was vacuum filtered and dried to obtain 1.25 g. of sodium N-succinyl-L-glutamate.

As far as is known, this compound is not described in the literature.

EXAMPLE III

Using the procedure of Example II, 1.32 g. of N-succinyl-L-glutamate and 2.25 g. of dl-lysine were reacted to obtain the dl-lysine salt of N-succinyl-L-glutamate.

As far as is known, this compound is not described in the literature.

PHARMACOLOGICAL STUDY

A. Protective action against endotoxins of *Escherichia coli*

Lots of 20 mice were given intraperitoneal injections of 0.5 mg. of endotoxin extracted from *Escherichia coli* $O_{26}B_6$ by the method of Westphal (Difco 3121). Immediately after the toxin injection, the mice were given intraperitoneally 8 mg. of N-succinyl-L-glutamic acid in solution in 0.5 cc. of water and the percentage of survivors was determined after 24 hours and after 7 days. The results are reported in Table I.

TABLE I

| Groups | Number of survivors (percent) after— | |
|---|---|---|
| | 24 hours | 7 days |
| Controls | 30 | 10 |
| Treated | 80 | 80 |

In a second test, 0.8 cc. of endotoxin were injected intraperitoneally and immediately thereafter, the mice received 15 mg. of N-succinyl-L-glutamic acid orally and the results are reported in Table II.

TABLE II

| Groups | Number of survivors (percent) after— | |
|---|---|---|
| | 24 hours | 7 days |
| Controls | 6.6 | 6.6 |
| Treated | 60.0 | 53.5 |

In a third test, 1.5 mg. of lipopolysaccharide endotoxin of *Escherichia coli* $O_{127}B_8$ were administered intraperitoneally and immediately thereafter, the mice received 12 mg. of N-succinyl-L-glutamic acid orally and the results are shown in Table III.

TABLE III

| Groups | Number of survivors (percent) after— | |
|---|---|---|
| | 24 hours | 7 days |
| Controls | 7.15 | 7.15 |
| Treated | 85.7 | 57.2 |

B. Protective action against endotoxins of *Salmonella enteritidis*

Lots of 10 mice were intraperitoneally injected with 1 mg. of lipopolysaccharide endotoxin extracted from *Salmonella enteritidis* W by the Westphal method and were simultaneously given orally 12 mg. of N-succinyl-L-glutamic acid. The percentage of survivors is reported in Table IV.

TABLE IV

| Groups | Number of survivors (percent) after— | |
|---|---|---|
| | 24 hours | 8 days |
| Controls | 22.2 | 5.5 |
| Treated | 61.0 | 39.0 |

C. Protective action against endotoxins of *Salmonella typhosa*

Lots of 10 mice were injected intraperitoneally with 0.9 mg. of lipopolysaccharide endotoxins of *Salmonella typhosa* 0–901 by the Westphal method and immediately thereafter were given orally 12 mg. of N-succinyl-L-glutamic acid. The results are reported in Table V.

TABLE V

| Groups | Number of survivors after 7 days, percent |
|---|---|
| Controls | 28.6 |
| Treated | 64.4 |

D. Protective action against toxic effects of antibiotics

Lots of 10 mice were given intraperitoneal injections of a solution of 11 mg. of tetracycline hydrochloride in 0.5 cc. of distilled water and immediately thereafter received orally 8 mg. of N-succinyl-L-glutamic acid. The results are reported in Table VI.

TABLE VI

| Groups | Number of survivors (percent) after— | |
|---|---|---|
| | 24 hours | 8 days |
| Controls | 50 | 0 |
| Treated | 100 | 90 |

In a second test, the mice received orally 15 mg. of N-succinyl-L-glutamic acid and the results are given in Table VII.

TABLE VII

| Groups | Number of survivors (percent) after— | |
|---|---|---|
| | 24 hours | 8 days |
| Controls | 50 | 0 |
| Treated | 100 | 50 |

The results show that N-succinyl-L-glutamic acid exercises a protective action against the toxic effects of bacterial endotoxins when administered orally or intraperitoneally. A protective action was also observed against the toxic effects of tetracycline hydrochloride administered intraperitoneally in strong doses. In the two cases, the protective effect was shown by the lateness and the important reduction in the mortality of the treated animals.

PHARMACEUTICAL EXAMPLES

A. Drinkable suspensions of tetracycline lauryl sulfate and sodium N-succinyl-L-glutamate

| | G. |
|---|---|
| Tetracycline lauryl sulfate | 4 |
| Sodium N-succinyl-L-glutamate | 6 |
| Glycerol | 18 |
| Crystalline sugar | 43 |
| Monostearate of polyoxyethylene glycol 1000 | 0.625 |
| Tragacanth gum | 0.700 |
| Sorbic acid | 0.25 |
| Sodium bicarbonate | 0.187 |
| Sodium meta bisulfite | 0.100 |
| Artificial fruit flavoring | 0.07 |
| Water to obtain 100 cc. | |

B. Tablets

| | G. |
|---|---|
| Tetracycline hydrochloride | 0.25 |
| N-succinyl-L-glutamic acid | 0.25 |
| Buffer excipient to obtain final tablet of 0.60 gm. | |

Various modifications of the compositions and methods of the invention may be made without departing from the spirit or scope thereof and it is to be understood that the invention is to be limited only as defined in the appended claims.

What is claimed is:

1. A method for treating bacterial toxins in warm-blooded animals comprises administering to said warm-blooded animals, an effective amount for treating bacterial toxins of a compound selected from the group consisting of N-succinyl-glutamic acid and its salts with non-toxic, pharmaceutically acceptable organic and mineral bases.

2. The method of claim 1 wherein the compound is N-succinyl-glutamic acid.

3. The method of claim 1 wherein the compound is N-succinyl-L-glutamic acid.

4. The method of claim 1 wherein the compound is the trisodium salt of N-succinyl-glutamic acid.

5. The method of claim 1 wherein the compound is the lysine salt of N-succinyl-glutamic acid.

References Cited

Chemical Abstracts 54: 12269c (1960).
Chemical Abstracts 56: 10682h (1962).

JEROME V. GOLDBERG, Primary Examiner

U.S. Cl. X.R.

424—118, 181, 227, 246, 271, 319